(12) United States Patent
Cho et al.

(10) Patent No.: US 10,191,187 B2
(45) Date of Patent: Jan. 29, 2019

(54) OUTDOOR DISPLAY APPARATUS

(71) Applicant: SAMSUNG ELECTRONICS CO., LTD., Suwon-si (KR)

(72) Inventors: Jin Hyun Cho, Seoul (KR); Jin Soo Pyo, Seoul (KR); Jung Kyun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 15/086,538

(22) Filed: Mar. 31, 2016

(65) Prior Publication Data
US 2016/0291214 A1  Oct. 6, 2016

(30) Foreign Application Priority Data

Mar. 31, 2015 (KR) .................. 10-2015-0045572
Dec. 8, 2015 (KR) .................. 10-2015-0174073

(51) Int. Cl.
*G02B 1/18* (2015.01)
*G02F 1/1333* (2006.01)
(Continued)

(52) U.S. Cl.
CPC .............. *G02B 1/18* (2015.01); *G02B 5/208* (2013.01); *G02B 5/3041* (2013.01);
(Continued)

(58) Field of Classification Search
CPC .......... G02F 1/133308; G02F 1/13336; G02F 1/133528; G02F 1/13363; G02F 1/133603; G02F 1/133606; G02F 1/133602; G02F 1/133615; G02F 1/133611; G02F 1/13362; G02F 2001/133311; G02F 2001/133541; G02F 2001/133638; G02F 2001/133331;
(Continued)

(56) References Cited

U.S. PATENT DOCUMENTS

2011/0234945 A1* 9/2011 Park ...................... G02B 5/208
349/96
2011/0261299 A1* 10/2011 Tai ........................ G02B 27/26
349/98
(Continued)

FOREIGN PATENT DOCUMENTS

EP  2482123 A2  8/2012
EP  2527399 A1  11/2012

OTHER PUBLICATIONS

Communication dated Jun. 20, 2016, issued by the European Patent Office in counterpart European Application No. 16163290.6.
(Continued)

*Primary Examiner* — Angela K Davison
(74) *Attorney, Agent, or Firm* — Sughrue Mion, PLLC

(57) ABSTRACT

An outdoor display apparatus is provided. The outdoor display apparatus includes a display panel, a transparent panel disposed in front of the display panel, a light-blocking layer disposed on a front surface of the transparent panel and configured to block a portion of light transmitted to the display panel, an anti-graffiti layer disposed on a front surface of the light-blocking layer, a light-absorbing layer disposed on a rear surface of the transparent panel, and an anti-fog layer disposed on a rear surface of the light-absorbing layer.

17 Claims, 8 Drawing Sheets

(51) Int. Cl.
*G02B 5/20* (2006.01)
*G02B 5/30* (2006.01)
*G02F 1/1335* (2006.01)
*G02F 1/13363* (2006.01)

(52) U.S. Cl.
CPC ....... *G02B 5/3083* (2013.01); *G02F 1/13336* (2013.01); *G02F 1/13363* (2013.01); *G02F 1/133308* (2013.01); *G02F 1/133512* (2013.01); *G02F 1/133528* (2013.01); *G02F 2001/133311* (2013.01); *G02F 2001/133331* (2013.01); *G02F 2001/133541* (2013.01); *G02F 2001/133638* (2013.01); *G02F 2201/50* (2013.01)

(58) Field of Classification Search
CPC ......... G02F 2201/50; G02B 1/18; G02B 1/11; G02B 1/16; G02B 5/208; G02B 5/3041; G02B 5/3083; G09F 13/04; G09F 13/0413; G09F 203/222
USPC ................................. 349/122; 40/548, 577
See application file for complete search history.

(56) References Cited

U.S. PATENT DOCUMENTS

| | | | | |
|---|---|---|---|---|
| 2011/0310470 | A1* | 12/2011 | Horie | G02F 1/133502 359/352 |
| 2013/0098524 | A1* | 4/2013 | Suzuki | C09J 135/04 156/60 |
| 2013/0301241 | A1* | 11/2013 | Maeda | F21V 29/00 362/97.1 |
| 2014/0218918 | A1* | 8/2014 | Moriwaki | H04N 5/64 362/237 |
| 2017/0123261 | A1* | 5/2017 | Miyazaki | G02F 1/133528 |

OTHER PUBLICATIONS

Communication issued Aug. 18, 2017 by the European Patent Office in counterpart European Patent Application No. 16 163 290.6.
Communication dated Apr. 5, 2018 issued by the European Patent Office in counterpart European Patent Application No. 16163290.6.
Communication dated Sep. 27, 2018, issued by the European Patent Office in counterpart European Application No. 16 163 290.6.

* cited by examiner

OUTDOOR DISPLAY APPARATUS

CROSS-REFERENCE TO RELATED APPLICATION

This application claims the benefit of Korean Patent Application Nos. 10-2015-0045572, filed on Mar. 31, 2015 and 10-2015-0174073, filed on Dec. 8, 2015 in the Korean Intellectual Property Office, the disclosures of which are incorporated herein by reference in their entireties.

BACKGROUND

1. Field

Apparatuses consistent with exemplary embodiments relate to an outdoor display apparatus to be used outdoors.

2. Description of the Related Art

A display apparatus is an apparatus for displaying an image.

Generally, the display apparatus includes a display module formed of a display panel having a screen on which an image is displayed, a backlight to supply light to the display panel, a substrate to transmit power and a control signal to the display apparatus, and chassis for supporting the display panel and the backlight, etc.

Among display apparatuses, there is an outdoor display apparatus used for outdoor advertisement, etc.

When the outdoor display apparatus is disposed outdoors, the outdoor display apparatus is easily exposed to rain or dust, etc. and the inner configurations of the display module mentioned above may be contaminated by rain or dust.

Consequently, the outdoor display apparatus includes a housing configured to accommodate a display module and having an opening formed at a front surface thereof, and a transparent panel to cover the opening of the housing with a transparent material.

Thus, the screen of the display module is visible from the outside through the transparent panel while a front surface of the display module is protected by the transparent panel.

Here, when sunlight is incident on the transparent panel of the outdoor display apparatus, the sunlight may pass through the transparent panel and be transmitted to the display panel inside. In this case, the display panel may be deteriorated.

SUMMARY

An aspect of the present inventive concept provides an outdoor display apparatus capable of being used in a sunlit environment.

Another aspect of the present inventive concept provides an outdoor display apparatus having improved abilities of being maintained and repaired.

According to an aspect of an embodiment of the present inventive concept, an outdoor display apparatus includes a display panel, a transparent panel disposed in front of the display panel, a light-blocking layer disposed on a front surface of the transparent panel by a sputtering process and configured to block a portion of light transmitted to the display panel, an anti-graffiti layer disposed on a front surface of the light-blocking layer, a light-absorbing layer disposed on a rear surface of the transparent panel, and an anti-fog layer disposed on a rear surface of the light-absorbing layer.

The transparent panel may include tempered glass.

The anti-graffiti layer may be formed of a hydrophobic material.

The anti-fog layer may be formed of a hydrophilic material.

The light-absorbing layer may include a polarizing film attached to the rear surface of the transparent panel and a $\lambda/4$ film attached to a rear surface of the polarizing film.

The display panel may include a liquid crystal panel including a pair of glass substrates and a liquid crystal filled between the pair of glass substrates.

According to an aspect of another embodiment of the present inventive concept, an outdoor display apparatus includes at least one display module and a housing to accommodate the at least one display module, wherein the housing may include an opening to expose a front surface of the at least one display module to the outside, a transparent panel formed with a transparent material to cover the opening, a light-blocking layer disposed on a front surface of the transparent panel to decrease light transmitted to the at least one display panel, an anti-graffiti layer disposed on a front surface of the light-blocking layer, a light-absorbing layer disposed on a rear surface of the transparent panel, and an anti-fog layer disposed on a rear surface of the light-absorbing layer.

The transparent panel may include tempered glass.

The anti-graffiti layer may be formed of a hydrophobic material.

The anti-fog layer may be formed of a hydrophilic material.

The light-absorbing layer may include a polarizing film attached to the rear surface of the transparent panel and a $\lambda/4$ film attached to a rear surface of the polarizing film.

The display module may include a display panel facing the rear surface of the transparent panel disposed at a front surface of the display panel.

The display panel may include a liquid crystal panel including a pair of glass substrates and a liquid crystal filled between the pair of glass substrates.

The at least one display module may include a plurality of display modules vertically arranged and the housing may include a plurality of openings configured to correspond to the plurality of display modules and a plurality of transparent panels configured to respectively cover the plurality of openings.

According to an aspect of yet another embodiment of the present inventive concept, an outdoor display apparatus may include a transparent panel, a polarizing film disposed to face a rear surface of the transparent panel, a $\lambda/4$ film attached to a rear surface of the polarizing film; and a light-emitting diode (LED) display module disposed to face a rear surface of the transparent panel.

The LED display module may include a plurality of LEDs, and each of the polarizing film and the $\lambda/4$ film may include a plurality of through-holes disposed at positions respectively corresponding to the plurality of LEDs.

The outdoor display apparatus may further include an infrared blocking layer disposed between the rear surface of the transparent panel and a front surface of the polarizing film.

The infrared blocking layer may include a plurality of through-holes disposed at positions respectively corresponding to the plurality of LEDs.

The LED display module may include a plurality of LEDs disposed to face the rear surface of the transparent panel and a light source substrate on which the plurality of LEDs are arranged to be spaced apart from each other.

Each of the polarizing film and the $\lambda/4$ film may include a plurality of through-holes disposed at positions respectively corresponding to the plurality of LEDs.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Hereinafter, an outdoor display apparatus according to a first embodiment of the present inventive concept will be described with reference to the accompanying drawings.

Figure 1:
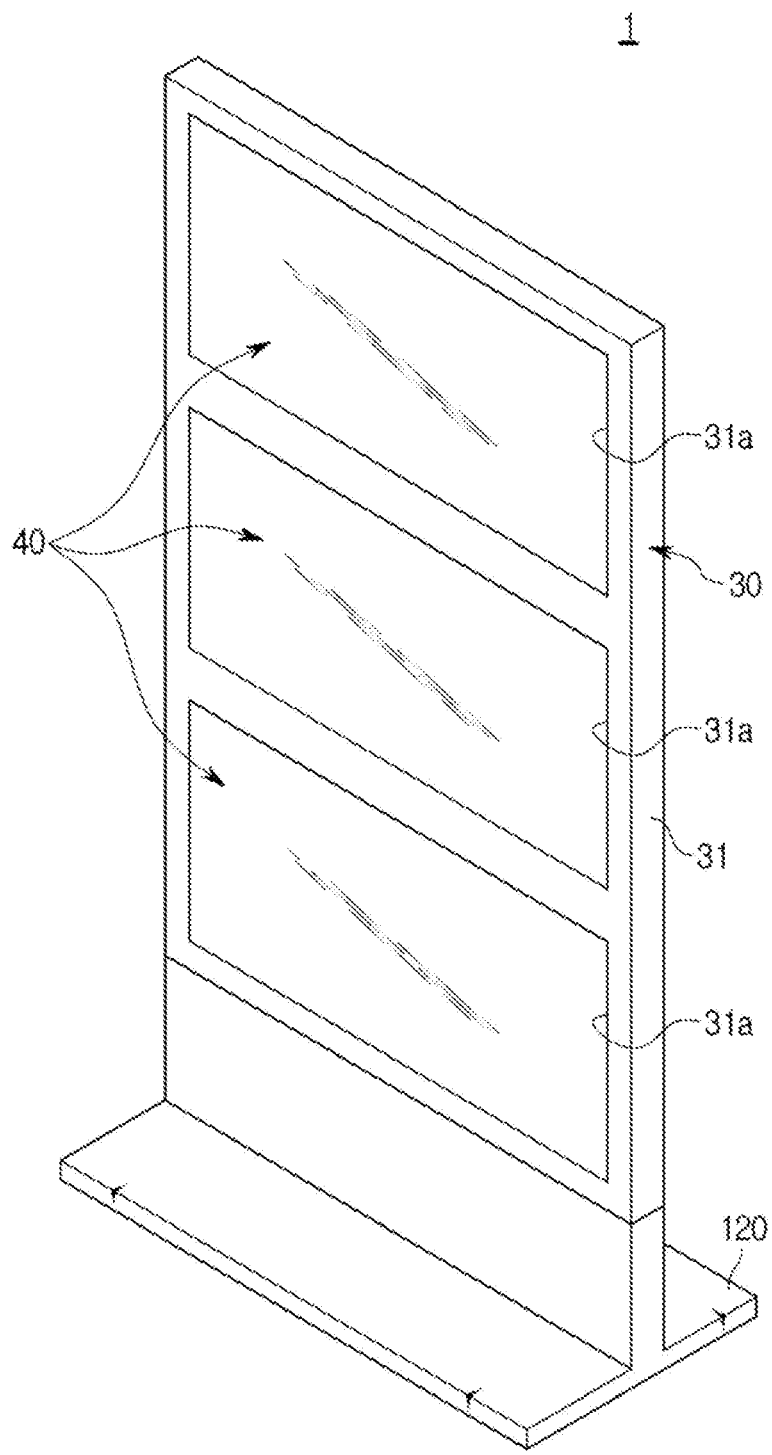
FIG. 1 is a perspective view of an outdoor display apparatus according to a first embodiment of the present inventive concept.
Figure 2:
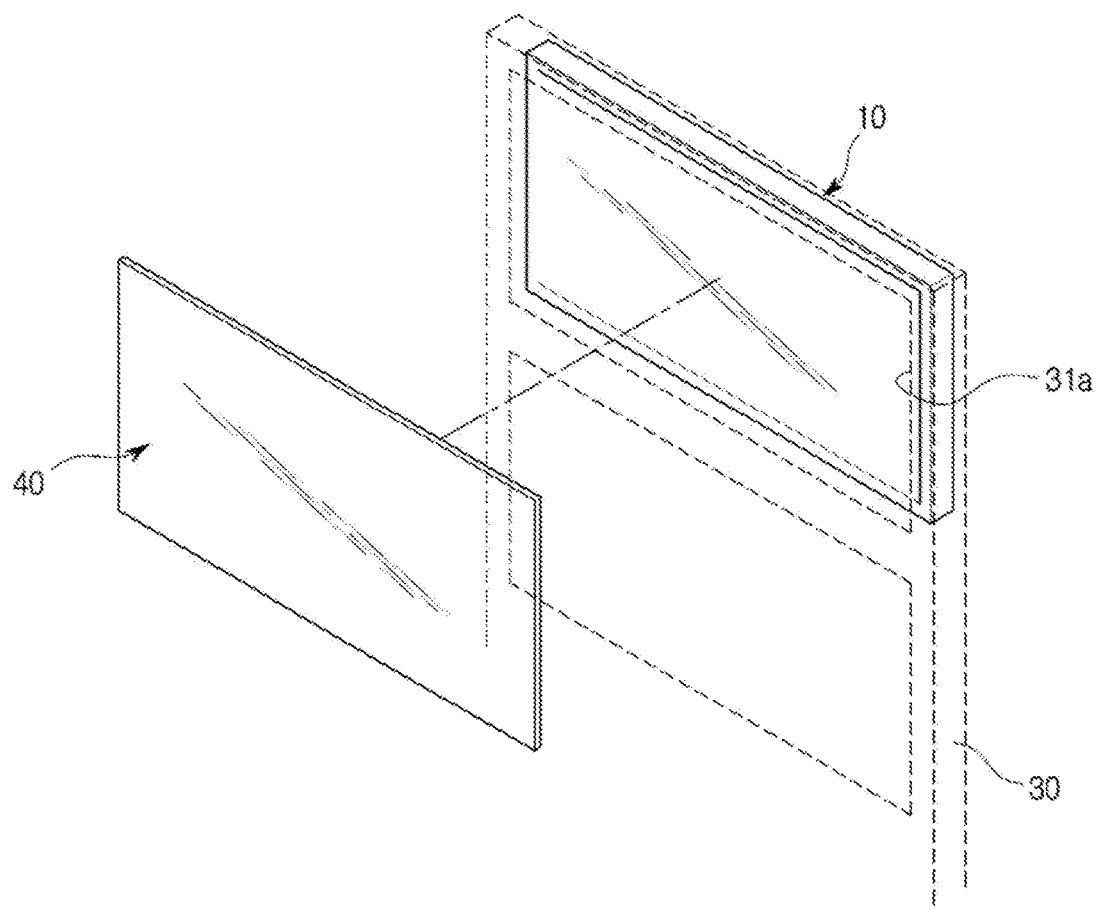
FIG. 2 is a perspective view illustrating a transparent panel and a display module of the outdoor display apparatus according to the first embodiment of the present inventive concept.

As illustrated in FIGS. 1 and 2, an outdoor display apparatus 1 according to the first embodiment of the present inventive concept is disposed and used outdoors where sunlight is radiated.

The outdoor display apparatus 1 includes three display modules 10 vertically arranged parallel to each other and a housing 30 configured to accommodate and support the three display modules 10 to maintain the three display modules 10 in the vertically arranged state.

Figure 3:
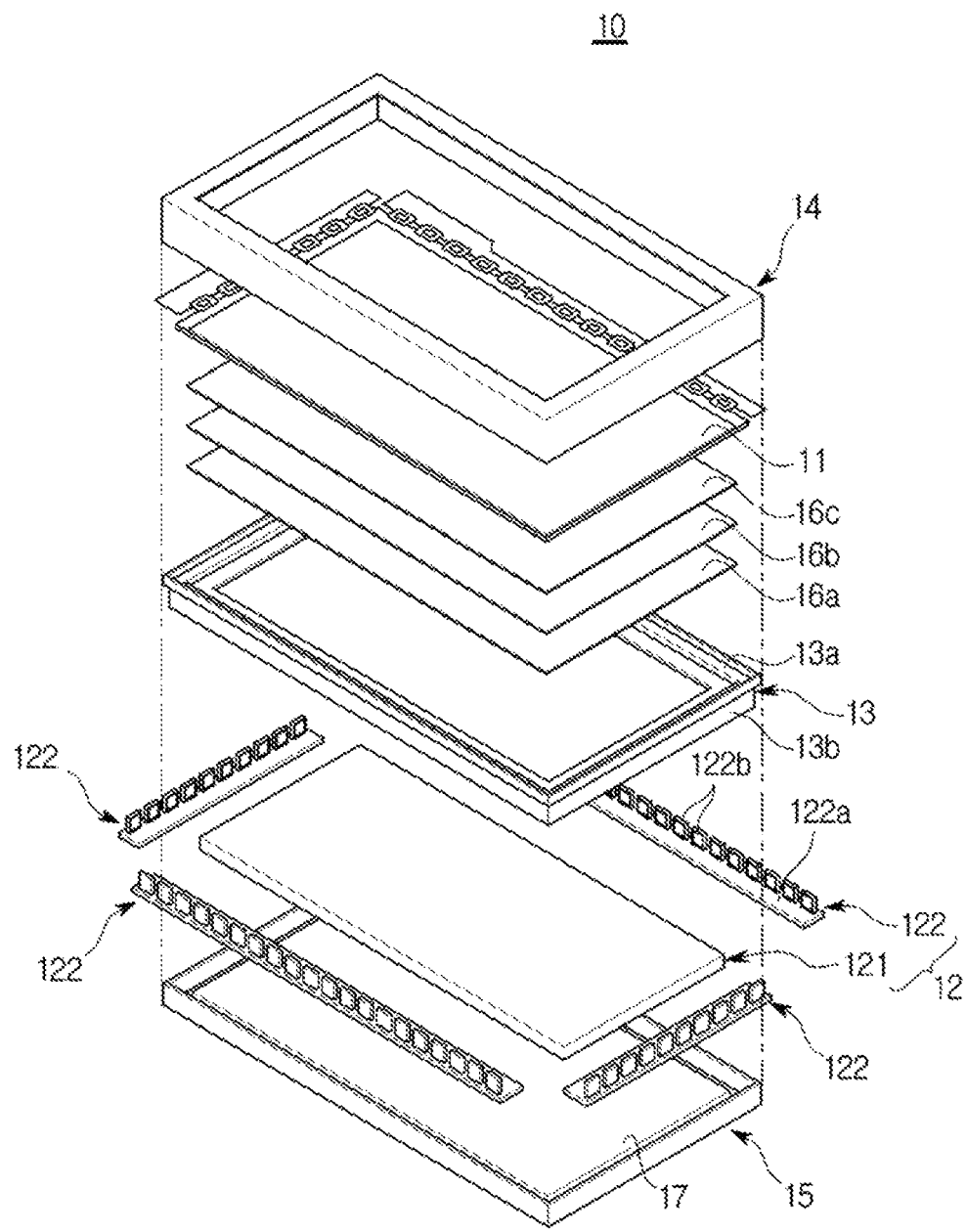
FIG. 3 is an exploded perspective view of the display module of the outdoor display apparatus according to the first embodiment of the present inventive concept.
Figure 4:
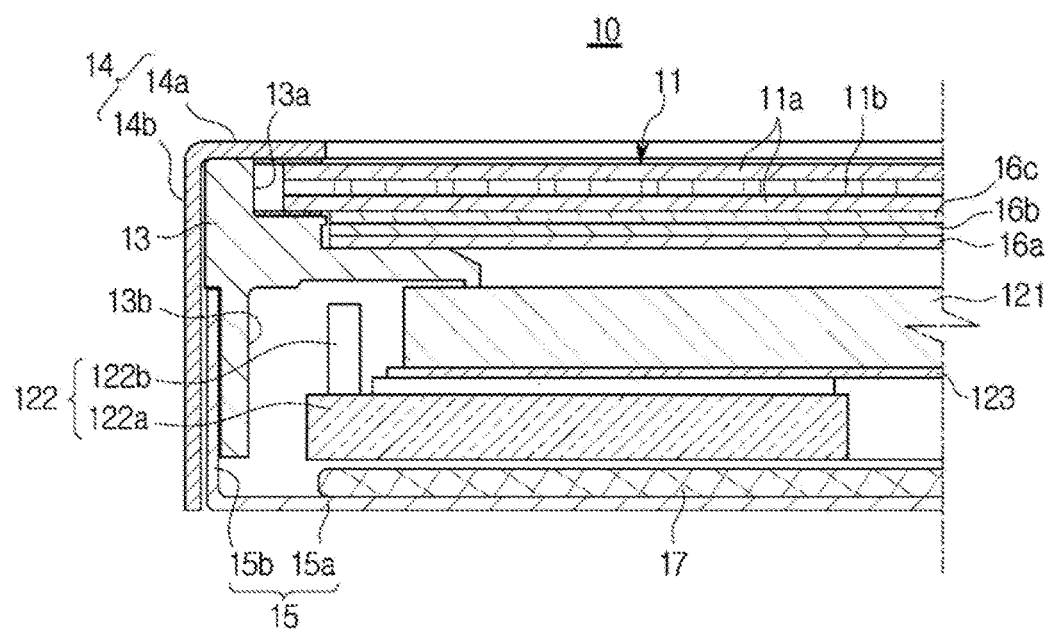
FIG. 4 is a cross-sectional view of the display module of the outdoor display apparatus according to the first embodiment of the present inventive concept.

As illustrated in FIGS. 3 and 4, each of the display modules 10 includes a display panel 11 configured to form a screen on which an image is displayed, a backlight 12 configured to supply light to the display panel 11, a middle mold 13 configured to support the display panel 11 and the backlight 12, a top chassis 14 configured to support and maintain the display panel 11 in front of the middle mold 13, and a bottom chassis 15 configured to support the backlight 12 behind the middle mold 13.

The display panel 11 is in a form of a liquid crystal panel formed by two glass substrates 11a and a liquid crystal 11b filled between the two glass substrates 11a on which electrodes are respectively disposed.

The backlight 12 includes a light guide member 121 formed in the shape of a quadrilateral plate and disposed behind the display panel 11, and four light sources 122 respectively disposed at four side surfaces, i.e. upper, lower, left, and right side surfaces, of the light guide member 121 such that the light sources 122 at the upper and lower side surfaces face each other and the light sources 122 at the left and right surfaces face each other.

In this embodiment, each of the four light sources 122 includes a substrate 122a extending by a length corresponding to one of the four side surfaces of the light guide member 121, and a plurality of LEDs 122b arranged in a row on the substrate 122a to face one of the four side surfaces of the light guide member 121. Light generated from the LEDs 122b is incident into the light guide member 121 through the four side surfaces, i.e. the upper, lower, left, and right side surfaces, and then guided to the display panel 11 by the light guide member 121.

The middle mold 13 includes a panel accommodation part 13a disposed in a front part of the middle mold 13 to accommodate and support the display panel 11 and a backlight accommodation part 13b disposed in a rear part of the middle mold 13 to accommodate the backlight 12.

The top chassis 14 includes a bezel portion 14a to support an outer boundary of the display panel 11 and a top side portion 14b coupled to the middle mold 13.

The bottom chassis 15 includes a rear portion 15a formed in the shape of a quadrilateral plate to support a rear surface of the light guide member 121 and a bottom side portion 15b coupled to the middle mold 13. The bottom chassis 15 is formed with a metal material such as aluminum or stainless steel with a high heat transfer rate to diffuse heat generated from the backlight 12 more rapidly along a surface thereof to facilitate heat radiation.

In this embodiment, a heat radiation member 17 in the shape of a plate to assist in heat diffusion is attached to a front surface of the bottom chassis 15 to diffuse heat generated from the light sources 122 more rapidly. Although a separately manufactured heat radiation member 17 is attached to the bottom chassis 15 in this embodiment, embodiments are not limited thereto. The heat radiation member 17 may also be formed in the shape of a plate having a predetermined level of rigidity or higher to be used as a bottom chassis.

In addition, a plurality of optical sheets 16a, 16b, and 16c for changing optical characteristics of light supplied to the display panel 11 from the backlight 12 are arranged between the backlight 12 and the display panel 11. The optical sheets 16a, 16b, and 16c include a diffusion sheet 16a to diffuse light transmitted from the backlight 12, a prism sheet 16b to refract and gather the light transmitted from the diffusion sheet 16a, and a protective sheet 16c to protect the prism sheet 16b.

As illustrated in FIG. 1, the housing 30 includes an accommodation part 31 formed in the shape of a vertically extended enclosure to accommodate the display modules 10, and a pedestal part 32 extending from a lower end of the accommodation part 31 to be horizontal to the ground to enable the outdoor display apparatus 1 to be stood on the ground and prevent the outdoor display apparatus from being overturned.

In addition, the housing 30 includes openings 31a disposed to respectively correspond to front surfaces of the display modules 10, and transparent panels 40 formed with a transparent material and installed to respectively cover the openings 31a. As described above, since the three display modules 10 are accommodated within the housing 30, three openings 31a are vertically disposed in the housing 30, and the openings 31a are respectively closed by the transparent panels 40.

In this embodiment, the transparent panels 40 are formed with tempered glass having a sufficiently high level of rigidity, and front surfaces of the display panels 11 face rear surfaces of the transparent panels 40.

Thus, screens displayed on the front surfaces of the display modules 10 are visible from the outside through the transparent panels 40 while the display modules 10 are protected from rain or dust, etc. outdoors by the housing 30 and the transparent panels 40.

In addition, although not illustrated in the drawings, an air circulator capable of easily radiating heat generated from the display modules 10 and the heat radiated by sunlight and substrates for controlling operations of the display modules 10 may be accommodated in a lower portion of the accommodation part 31 of the housing 30.

Since the outdoor display apparatus 1 is disposed outdoors, sunlight passes through the transparent panels 40 and is transmitted to the display panels 11, which may cause the display panels 11 to be deteriorated.

Figure 5:
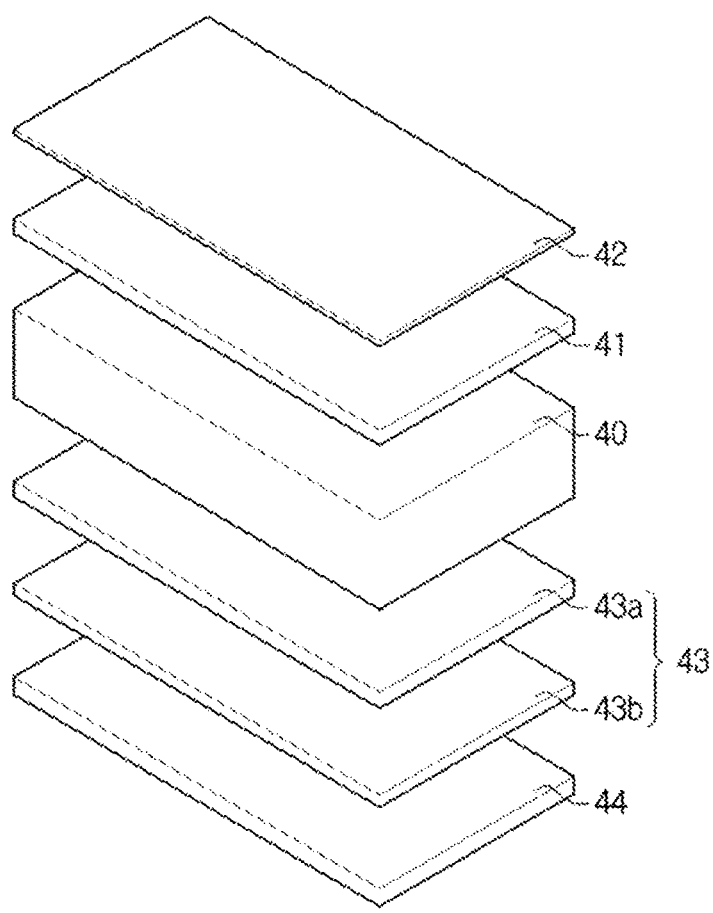
FIG. 5 is an exploded perspective view illustrating arrangement relations of the transparent panel, a light-blocking layer, an anti-graffiti layer, a light-absorbing layer, and an anti-fog layer of the outdoor display apparatus according to the first embodiment of the present inventive concept.
Figure 6:
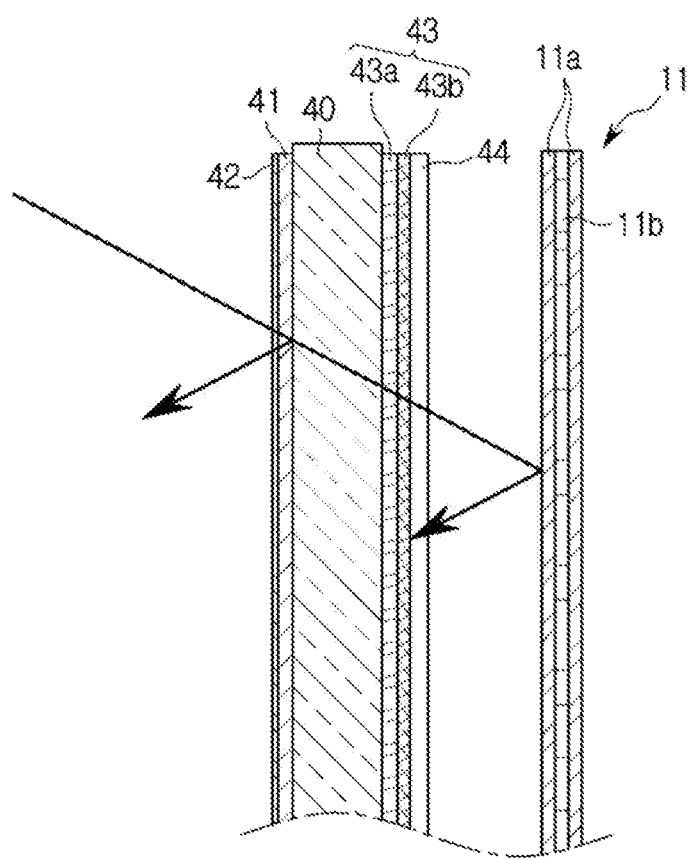
FIG. 6 is a partial cross-sectional view of the transparent panel and the display panel of the outdoor display apparatus according to the first embodiment of the present inventive concept.

In order to prevent the deterioration of the display panels 11, the outdoor display apparatus 1 includes a light-blocking layer 41 disposed on a front surface of each of the transparent panels 40 to reduce the amount of sunlight introduced into the housing 30 as illustrated in FIGS. 5 and 6. In this embodiment, the light-blocking layer 41 is formed by a sputtering process and serves to block infrared rays included in the sunlight and to improve visibility of the outdoor display apparatus 1 by reducing the amount of light reflected by the front surface of each of the transparent panels 40.

In addition, an anti-graffiti layer 42 is formed on a front surface of the light-blocking layer 41. The anti-graffiti layer 42 is formed with a hydrophobic material to make scribbling difficult and easily remove graffiti.

In addition, the outdoor display apparatus includes a light-absorbing layer 43 to absorb sunlight that has passed through the transparent panels 40 to reduce the amount of sunlight transmitted to the display panels 11.

The light-absorbing layer 43 is disposed on a rear surface of each of the transparent panels 40 and includes a polarizing film 43a and a λ/4 film 43b disposed on a rear surface of the polarizing film 43a. In this embodiment, the polarizing film 43a is attached to the rear surface of each of the transparent panels 40, and the λ/4 film 43b is attached to the rear surface of the polarizing film 43a.

The polarizing film 43a passes polarized light of only a specific polarizing axis of the light from the sunlight and absorbs remaining light.

The λ/4 film 43b is a film that forms an angle which is λ/4 by a cardinal number with a polarizing direction. The λ/4 film 43b may convert light that has passed through the polarizing film 43a into circularly polarized light or elliptically polarized light of 45° or 135° with respect to an optical axis of the light.

In addition, the outdoor display apparatus 1 includes an anti-fog layer 44 disposed on a rear surface of the light-absorbing layer 43 to prevent fogging phenomenon from occurring on the transparent panels 40.

Since the anti-fog layer 44 is formed with a hydrophilic material, even when condensate is generated on a rear surface of the anti-fog layer 44 due to a temperature difference between outdoors and an inner portion of the housing 30, the condensate is thinly spread on the rear surface of the anti-fog layer 44 such that the fogging phenomenon is prevented.

In this embodiment, each of the anti-graffiti layer 42, the light-absorbing layer 43, and the anti-fog layer 44 is manufactured in the form of a film and then attached to the display panel 11.

Next, operations of the outdoor display apparatus according to the first embodiment of the present inventive concept configured as above will be described.

In the description below, the polarizing film 43a is assumed as a polarizing film 43a that transmits only vertically polarized light.

When sunlight is incident toward the transparent panels 40 while the outdoor display apparatus 1 is disposed outdoors, the sunlight passes through the anti-graffiti layer 42 and is incident on the light-blocking layer 41. The light-blocking layer 41 blocks most of infrared rays that occupy approximately 50% of the sunlight.

In addition, the light-blocking layer 41 suppresses the sunlight from being reflected by the transparent panels 40. As a result of an experiment, when the light-blocking layer 41 is formed on each of the transparent panels 40 as in this embodiment, the amount of light reflected by the transparent panels 40 is reduced to a level of 0.3% of the incident sunlight.

Remaining sunlight passes through the transparent panels 40 and is incident on a front surface of the polarizing film 43a. Among the sunlight incident on the polarizing film 43a, only the vertically polarized light passes through the polarizing film 43a and is transmitted to the λ/4 film 43b, and remaining sunlight is absorbed by the polarizing film 43a. The light transmitted to the λ/4 film 43b in the vertically polarized state is converted into circularly polarized light while passing through the λ/4 film 43b.

In addition, the light that has passed through the λ/4 film 43b is reflected again by the front surface of the display panel 11 and is incident on a rear surface of the λ/4 film 43b. In a process of passing through the λ/4 film 43b again, the light incident on the rear surface of the λ/4 film 43b is converted into horizontally polarized light which is perpendicular to the light that has passed through the polarizing film 43a. Since the polarizing film 43a transmits only the vertically polarized light, the light incident on the rear surface of the polarizing film 43a is absorbed by the polarizing film 43a.

Since the sunlight incident toward the transparent panels 40 as above is blocked by the light-blocking layer 41 and then absorbed by the light-absorbing layer 43, the amount of sunlight transmitted to the display panels 11 is considerably reduced, and accordingly, the deterioration of the display panels 11 due to the sunlight decreases.

Although the display panels 11 are each formed of a liquid crystal panel in this embodiment, embodiments are not limited thereto and an organic LED panel may also be used as the display panels.

In addition, although the outdoor display apparatus 1 including the three display modules 10 has been described in this embodiment as an example, embodiments are not limited thereto, and the present inventive concept may also be wholly applied to an outdoor display apparatus having only one display module.

In addition, although the display modules 10 are vertically arranged in this embodiment, embodiments are not limited thereto. The display modules may also be horizontally arranged or vertically and horizontally arranged to form rows and columns.

In addition, although a case in which the outdoor display apparatus 1 is disposed outdoors is being described in this embodiment, this is merely an example. The outdoor display apparatus according to the present inventive concept may be used in any environment so long as the sunlight can be directly transmitted to the display panels being used outdoors. That is, the outdoor display apparatus according to the present inventive concept may also be arranged at an inside of glass windows of a building to be used.

Although four light sources 122 are disposed to respectively correspond to the four side surfaces of the light guide member 121 in this embodiment, this is in consideration that the outdoor display apparatus 1 is arranged at a sunlit outdoor space to be used. Only one or two light sources 122 may also be included in consideration of a location where the outdoor display apparatus 1 is installed.

In addition, although each of the light sources 122 is formed of the substrate 122a and the LEDs 122b in this embodiment, embodiments are not limited thereto and various types of light sources other than the above described light sources may be used.

In addition, although the backlight 12 includes the light guide member 121 and the light sources 122 disposed at the side surfaces of the light guide member 121 to face each other in this embodiment, embodiments are not limited thereto. The backlight may include only a plurality of light sources disposed behind a display panel without an element corresponding to the light guide member such that light generated from the light sources are directly radiated to a rear surface of the display panel.

Hereinafter, an outdoor display apparatus according to a second embodiment of the present inventive concept will be described.

Figure 7:
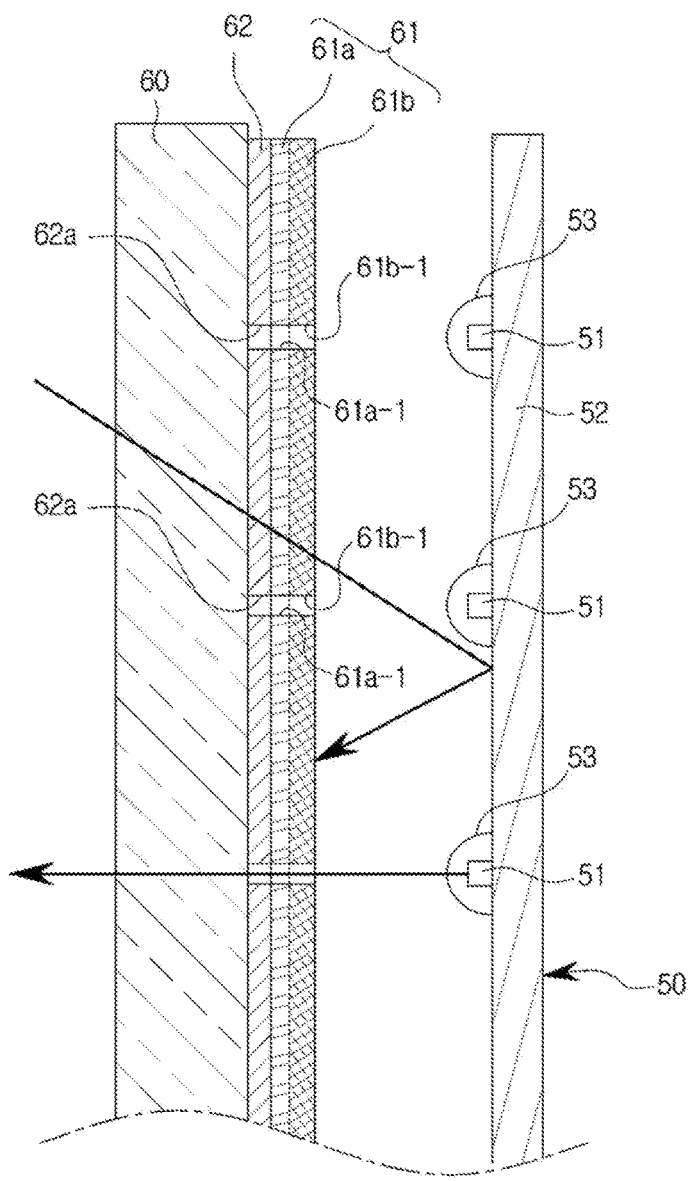
FIG. 7 is a cross-sectional view of an LED display module and a transparent panel applied to an outdoor display apparatus according to a second embodiment of the present inventive concept.
Figure 8:
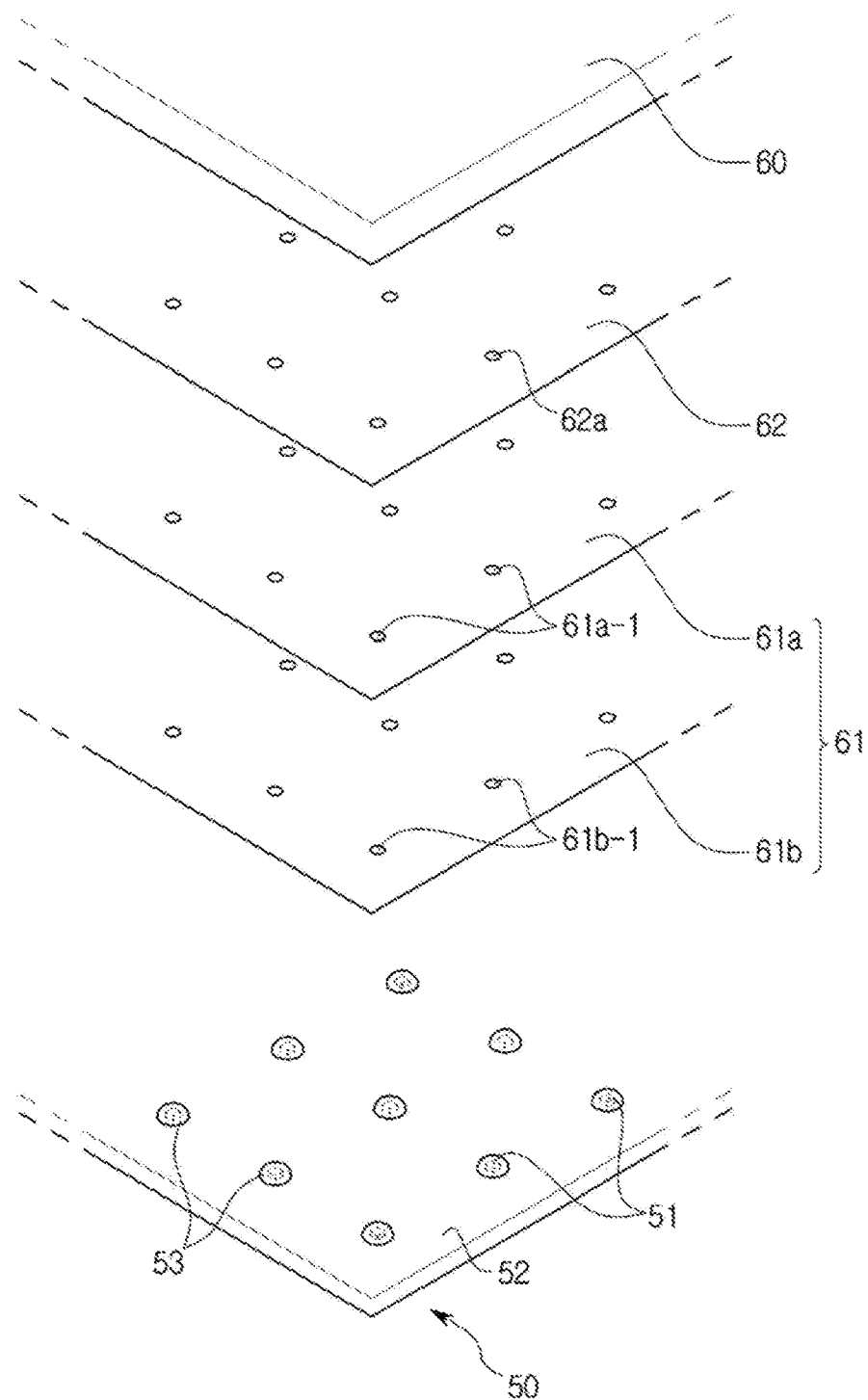
FIG. 8 is an exploded perspective view of the LED display module and the transparent panel applied to the outdoor display apparatus according to the second embodiment of the present inventive concept.

As illustrated in FIGS. 7 and 8, the outdoor display apparatus according to the second embodiment of the present inventive concept includes an LED display module 50 and a transparent panel 60 disposed in front of the LED display module 50.

The LED display module 50 includes a plurality of LEDs 51, and each of the plurality of LEDs 51 forms one pixel to be widely used in large display apparatuses such as a large electronic display, etc.

The LED display module 50 includes the plurality of LEDs 51 disposed to face a rear surface of the transparent panel 60 to radiate light toward the rear surface of the transparent panel 60, and a light source substrate 52 to transmit power and signals to the plurality of LEDs 51.

The LEDs 51 respectively include R, G, and B elements to express a color and are disposed on the light source substrate 52 spaced apart from each other at a predetermined interval such that each of the LEDs 51 forms one pixel. Also, lenses 53 formed of silicone, etc. to guide light generated from the LEDs 51 and protect the LEDs 51 from moisture or dust may be arranged on the LEDs 51.

Although not illustrated in the drawings, the light source substrate 52 may be formed of a plurality of partial substrates arranged in rows and columns in order to correspond to a large outdoor display apparatus.

In addition, the outdoor display apparatus includes a light-absorbing layer 61 for absorbing sunlight that has passed through the transparent panel 60 to reduce the amount of sunlight transmitted to the LED display module 50.

The light-absorbing layer 61 is disposed on the rear surface of the transparent panel 60 and includes a polarizing film 61a and a λ/4 film 61b disposed on a rear surface of the polarizing film 61a. In this embodiment, the polarizing film 61a is attached to a rear surface of an infrared blocking layer 62 to be described below, and the λ/4 film 61b is attached to the rear surface of the polarizing film 61a.

In addition, the infrared blocking layer 62 to block infrared rays is disposed on the rear surface of the transparent panel 60, and the light-absorbing layer 61 is disposed on the rear surface of the infrared blocking layer 62 in this embodiment. That is, the infrared blocking layer 62 is attached to the rear surface of the transparent panel 60, a front surface of the polarizing film 61a is attached to the rear surface of the infrared blocking layer 62, and a front surface of the λ/4 film 61b is attached to the rear surface of the polarizing film 61a.

When the infrared blocking layer 62 is disposed as above, the infrared rays which occupy approximately 50% of the sunlight may be prevented from being transmitted to the LED display module 50.

Meanwhile, transmitting the largest possible amount of light generated from the LEDs 51 to the outside of the transparent panel 60 is beneficial in displaying a bright screen. To do increase the transmittance of the light to the outside of the transparent panel 60, through-holes 62a, 61a-1, and 61b-1 are respectively disposed at positions of the infrared blocking layer 62 and the light-absorbing layer 61 (i.e. the polarizing film 61a and the λ/4 film 61b) corresponding to the LEDs 51. That is, most of light generated from the LEDs 51 may pass through the light-absorbing layer 61 and the infrared blocking layer 62 via the through-holes 62a, 61a-1, and 61b-1 disposed in front of the LEDs 51 to respectively correspond to the LEDs 51.

When the sunlight is incident on the transparent panel 60 of the outdoor display apparatus configured as above, infrared rays included in the sunlight are blocked by the infrared blocking layer 62, and remaining sunlight is transmitted to the polarizing film 61a of the light-absorbing layer 61.

Only the vertically polarized light of the light transmitted to the polarizing film 61a of the light-absorbing layer 61 passes through the polarizing film 61a of the light-absorbing layer 61 and is transmitted to the λ/4 film 61b, and remaining light is absorbed by the polarizing film 61a. The light transmitted to the λ/4 film 61b in the vertically polarized state is converted into circularly polarized light in a process of passing through the λ/4 film 61b.

In addition, the light that has passed through the λ/4 film 61b is reflected again by a front surface of the light source substrate 52 to be incident on a rear surface of the λ/4 film 61b. In a process of passing through the λ/4 film 61b again, the light incident on the rear surface of the λ/4 film 61b is converted into horizontally polarized light which is perpendicular to the light that has passed through the polarizing film 61a. Since the polarizing film 61a transmits only the vertically polarized light, the light incident on the rear surface of the polarizing film 61a is absorbed into the polarizing film 61a.

Here, of the light incident on the transparent panel 60, light incident on portions where the through-holes 62a, 61a-1, and 61b-1 are located passes through the through-holes 62a, 61a-1, and 61b-1 and is transmitted to the light source substrate 52 directly. However, since areas of regions on which the through-holes 62a, 61a-1, and 61b-1 are disposed occupy less than 1% of the whole area of the transparent panel 60 and are extremely small, influences caused by the through-holes 62a, 61a-1, and 61b-1 are small.

Meanwhile, most of the light generated from the LEDs 51 to illuminate a screen passes through the through-holes 62a, 61a-1, and 61b-1 disposed to respectively correspond to the LEDs 51 and the transparent panel 60 to be projected toward the front of the outdoor display apparatus 1.

Consequently, optical loss that may occur when the light generated from the LEDs 51 passes through the light-absorbing layer 61 decreases.

Although the infrared blocking layer 62 is disposed between the rear surface of the transparent panel 60 and a front surface of the light-absorbing layer 61 in this embodiment, this is merely an example and the infrared blocking layer 62 may also be omitted.

In addition, although the through-holes 62*a*, 61*a*-1, and 61*b*-1 are disposed at the light-absorbing layer 61 and the infrared blocking layer 62 to block the sunlight and decrease optical loss occurring in the LEDs 51 in this embodiment, embodiments are not limited thereto. An element corresponding to the through-holes 62*a*, 61*a*-1, and 61*b*-1 may also be omitted to more efficiently block the sunlight. In this case, a larger amount of light may be generated in the LEDs 51 to compensate for optical loss due to the light-absorbing layer 61.

According to an aspect of the present inventive concept, an outdoor display apparatus includes a light-blocking layer and a light-absorbing layer disposed at a transparent panel such that sunlight transmitted to a display panel can be reduced and deterioration of the display panel can be suppressed.

In addition, according to another aspect of the present inventive concept, an outdoor display apparatus includes an anti-graffiti layer disposed at a transparent panel such that scribbling on the apparatus is difficult and graffiti on the apparatus can be easily removed.

Further, according to yet another aspect of the present inventive concept, an outdoor display apparatus includes an anti-fog layer disposed at a transparent panel such that a fogging phenomenon can be suppressed even when condensate is generated due to a temperature difference between outdoors and an inner portion of a housing.

In addition, according to another aspect of the present inventive concept, an outdoor display apparatus is capable of reducing sunlight transmitted to an LED display module.

The present inventive concept is not limited to the embodiments described above, and it is apparent to those of ordinary skill in the art that the embodiments may be modified and changed in various ways within the scope not departing from the spirit of the present inventive concept. Consequently, modified embodiments or changed embodiments should be deemed as belonging to the claims of the present application.

What is claimed is:

1. An outdoor display apparatus comprising:
a display panel;
a transparent panel disposed in front of the display panel;
a light-blocking layer disposed on a front surface of the transparent panel by a sputtering process and configured to block a portion of light transmitted to the display panel;
an anti-graffiti layer disposed on a front surface of the light-blocking layer;
a light-absorbing layer disposed on a rear surface of the transparent panel and in front of the display panel and between the transparent panel and the display panel; and
an anti-fog layer disposed on a rear surface of the light-absorbing layer,
wherein the light-blocking layer is disposed between the anti-graffiti layer and the transparent panel,
wherein the light-absorbing layer comprises a polarizing film having a front surface and a rear surface, and a $\lambda/4$ film having a front surface and a rear surface, and
wherein the front surface of the polarizing film is attached to the rear surface of the transparent panel, the front surface of the $\lambda/4$ film is attached to the rear surface of the polarizing film, and the anti-fog layer is attached to the rear surface of the $\lambda/4$ film.

2. The outdoor display apparatus according to claim 1, wherein the transparent panel comprises tempered glass.

3. The outdoor display apparatus according to claim 1, wherein the anti-graffiti layer is formed of a hydrophobic material.

4. The outdoor display apparatus according to claim 1, wherein the anti-fog layer is formed of a hydrophilic material.

5. The outdoor display apparatus according to claim 1, wherein the display panel comprises a liquid crystal panel including a pair of glass substrates and a liquid crystal filled between the pair of glass substrates.

6. An outdoor display apparatus comprising:
at least one display module; and
a housing configured to accommodate the at least one display module,
wherein the housing comprises:
an opening configured to expose a front surface of the at least one display module to the outside,
a transparent panel formed with a transparent material to cover the opening,
a light-blocking layer disposed on a front surface of the transparent panel to decrease light transmitted to the at least one display module,
an anti-graffiti layer disposed on a front surface of the light-blocking layer,
a light-absorbing layer disposed on a rear surface of the transparent panel and in front of the display module and between the transparent panel and the display module, and
an anti-fog layer disposed on a rear surface of the light-absorbing layer,
wherein the light-blocking layer is disposed between the anti-graffiti layer and the transparent panel,
wherein the light-absorbing layer comprises a polarizing film having a front surface and a rear surface, and a $\lambda/4$ film having a front surface and a rear surface, and
wherein the front surface of the polarizing film is attached to the rear surface of the transparent panel, the front surface of the $\lambda/4$ film is attached to the rear surface of the polarizing film, and the anti-fog layer is attached to the rear surface of the $\lambda/4$ film.

7. The outdoor display apparatus according to claim 6, wherein the transparent panel comprises tempered glass.

8. The outdoor display apparatus according to claim 6, wherein the anti-graffiti layer is formed of a hydrophobic material.

9. The outdoor display apparatus according to claim 6, wherein the anti-fog layer is formed of a hydrophilic material.

10. The outdoor display apparatus according to claim 6, wherein the display module comprises a display panel facing the rear surface of the transparent panel disposed at a front surface of the display panel.

11. The outdoor display apparatus according to claim 10, wherein the display panel comprises a liquid crystal panel including a pair of glass substrates and a liquid crystal filled between the pair of glass substrates.

12. The outdoor display apparatus according to claim 6, wherein:
the at least one display module comprises a plurality of display modules vertically arranged; and the housing comprises a plurality of openings configured to correspond to the plurality of display modules and a plurality of transparent panels configured to respectively cover the plurality of openings.

13. An outdoor display apparatus comprising:
a transparent panel;
a polarizing film disposed to face a rear surface of the transparent panel;
a λ/4 film attached to a rear surface of the polarizing film; and
a light-emitting diode (LED) display module disposed to face a rear surface of the transparent panel,
wherein the LED display module comprises a plurality of LEDs, and each of the polarizing film and the λ/4 film comprises a plurality of through-holes disposed at positions respectively corresponding to the plurality of LEDs.

14. The outdoor display apparatus according to claim 13, further comprising an infrared blocking layer disposed between the rear surface of the transparent panel and a front surface of the polarizing film.

15. The outdoor display apparatus according to claim 13, wherein the LED display module comprises a plurality of LEDs disposed to face the rear surface of the transparent panel and a light source substrate on which the plurality of LEDs are arranged to be spaced apart from each other.

16. An outdoor display apparatus comprising:
a transparent panel;
a polarizing film disposed to face a rear surface of the transparent panel;
a λ/4 film attached to a rear surface of the polarizing film;
a light-emitting diode (LED) display module disposed to face a rear surface of the transparent panel; and
an infrared blocking layer disposed between the rear surface of the transparent panel and a front surface of the polarizing film,
wherein the infrared blocking layer comprises a plurality of through-holes disposed at positions respectively corresponding to a plurality of LEDs of the LED display module.

17. The outdoor display apparatus according to claim 16, wherein each of the polarizing film and the λ/4 film comprises a plurality of through-holes disposed at positions respectively corresponding to the plurality of LEDs.

* * * * *